United States Patent
Driscoll et al.

(10) Patent No.: US 11,455,358 B2
(45) Date of Patent: Sep. 27, 2022

(54) DATA SPACES FOR MULTI-TENANT COMPUTING

(71) Applicant: TRACELINK, INC., North Reading, MA (US)

(72) Inventors: Christopher Driscoll, Methuen, MA (US); Robert Sturim, Wenham, MA (US); Shabbir Dahod, Andover, MA (US)

(73) Assignee: Tracelink, Inc., North Reading, MA (US)

( * ) Notice: Subject to any disclaimer, the term of this patent is extended or adjusted under 35 U.S.C. 154(b) by 0 days.

(21) Appl. No.: 16/937,140

(22) Filed: Jul. 23, 2020

(65) Prior Publication Data

US 2022/0027423 A1    Jan. 27, 2022

(51) Int. Cl.
*G06F 16/9535* (2019.01)
*G06F 16/25* (2019.01)

(52) U.S. Cl.
CPC ........ *G06F 16/9535* (2019.01); *G06F 16/258* (2019.01)

(58) Field of Classification Search
CPC .................. G06F 16/9535; G06F 16/258
See application file for complete search history.

(56) References Cited

U.S. PATENT DOCUMENTS

| | | | |
|---|---|---|---|
| 2010/0250497 A1* | 9/2010 | Redlich | H04L 63/0227 707/661 |
| 2017/0371690 A1* | 12/2017 | Bailey | G06F 9/45504 |
| 2018/0083826 A1* | 3/2018 | Wilson | G06F 21/50 |
| 2018/0218044 A1* | 8/2018 | Wong | G06F 16/24554 |

* cited by examiner

*Primary Examiner* — Alford W Kindred
*Assistant Examiner* — Lin Lin M Htay
(74) *Attorney, Agent, or Firm* — CRGO Global; Steven M. Greenberg

(57) ABSTRACT

Embodiments of the present invention provide a method, system and computer program product for data spaces for multi-tenancy computing. In an embodiment of the invention, different application networks are deployed into a multi-tenancy computing environment. The different application networks each provide common program logic for one or more application instances accessed by different end users. As well, the different end users exchange messages between one another within a same one of the networks. For each of the networks, a separate data space is defined within the multi-tenancy computing system, each including an interface to one or more data repositories. Finally, data queries by ones of the different end users may be processed by extracting meta-data from each of the queries and filtering corresponding underlying data queries to the data repositories with a key derived from the extracted meta-data.

18 Claims, 2 Drawing Sheets

DATA SPACES FOR MULTI-TENANT COMPUTING

BACKGROUND OF THE INVENTION

Field of the Invention

The present invention relates to the field of multi-tenant computing and more particularly to data access in a multi-tenant computing environment.

Description of the Related Art

Traditional computing includes the execution of a computer program in memory of a computer by a processor of the computer. Ordinarily, a single user accesses a corresponding single computer program at any one time; however, some multi-user computer programs permit the simultaneous access of the computer program and the data produced and accessible therein. Within a single organization, supporting a multi-user computer program makes sense. In this regard, within a single organization, data sharing is permitted and this, each individual accessing the multi-user computer program may be permitted to access the same data. As well, to the extent that different users within the same organization enjoy different access rights to different data, certain portions of the data can be restricted from access for different users.

The computing resources required to support the execution of a single application generally are limited and therefore manageable. Even for a small organization, maintaining a minimal closet of computing resources is only a small burden. But, to support the execution of multiple computer programs so as to accommodate a large number of simultaneous users within an organization, a large number of computing resources are required. As such, many organizations elect to outsource the hosting of physical computing resources to a remote, managed site. As well, to the extent that different users within an organization may be geographically dispersed, hosting multiple computing resources in a centrally disposed location or even at multiple different locations can be of great importance.

Notwithstanding, despite the efficiencies gained by remotely positioning one's own multi-user computer programs in a hosted server farm, managed, hosted services can be quite costly—especially in terms of software licensing fees. Consequently, modern trends in computing capitalize on the notion of a multi-tenant computing environment. A multi-tenant computing environment is a hosted computing environment in which a single instance of a computer program executes in a centralized computing infrastructure while remaining accessible to multiple different users across multiple different organizations. In particular, in comparison to a multi-instance architecture, in a multi-tenant environment, each tenant is a group of users sharing common access with specific privileges to a single instance of the computer program. Each tenant then enjoys a dedicated share of the single instance of the computer program, including corresponding data, configuration, user management, tenant individual functionality and non-functional properties.

The fundamental concern in the subscription to a hosted, multi-tenant environment begins and ends with data security. An organization subscribing to an application instance in a multi-tenant environment must be assured of the security of organizational data from access by other organizations also subscribing to the same application instance. Consequently, the typical multi-tenant environment segregates organizational data in different, separate database stores so that one organization is not permitted to access the database store of another. As well, data communications between different users of different organizations of the single application instance remain separate from one another, with each organization having its own set of communication channels established with the single instance of the application.

It is a distinct advantage of the multi-tenancy architecture that all subscribers, also known as "tenants", receive access to a most recent version of a commonly accessed application since updating the application for one tenant necessarily means updating the application for all tenants. However, it is a less obvious, but equally important disadvantage of a multi-tenant environment that all subscribers are compelled to use an identical version of an application since all subscribers access the same instance of the same application at any given time. Consequently, to the extent that one of the subscribers, e.g. tenants, seeks to access a legacy or slightly older version of an application, that subscriber is then forced to access a completely different instance of the application outside of the multi-tenancy architecture or within a completely separate multi-tenancy architecture. As such, inefficiently, the application manager must then manage two different deployments of the same application in a hosted environment.

BRIEF SUMMARY OF THE INVENTION

Embodiments of the present invention address deficiencies of the art in respect to data access in a multi-tenancy environment and provide a novel and non-obvious method, system and computer program product for different data spaces for multi-tenancy computing. In an embodiment of the invention, different application networks are deployed into a multi-tenancy computing environment. The different application networks each provide common program logic for one or more application instances accessed by different end users. As well, the different end users exchange messages between one another within a same one of the networks. For each of the networks, a separate data space is defined within the multi-tenancy computing system, each including an interface to one or more data repositories. Finally, data queries by ones of the different end users may be processed by extracting meta-data from each of the queries and filtering corresponding underlying data queries to the data repositories with a key derived from the extracted meta-data.

In one aspect of the embodiment, the meta-data is an identifier of a requesting one of the end users. In another aspect of the embodiment, the meta-data is a combination of an identifier of the requesting one of the end users and an identifier for a corresponding one of the application instances. In yet another aspect of the embodiment, the meta-data is an identifier of a requesting one of the end users and a target one of the end users. To that end, the data in the set can be confirmed to correspond to the identifier of the requesting one of the end users and the target one of the end users. Thereafter, portions of the data are filtered from the set that do not correspond to the identifier of the requesting one of the end users and the target one of the end users. In even yet another aspect of the embodiment, a result set of data is received in response to one of the corresponding underlying data queries to the data repositories. Then, an underlying data source type is identified for one of the corresponding underlying data queries to the data repositories. Finally, the one of the corresponding underlying data queries is formatted in a format defined for the data source type.

In another embodiment of the invention, a multi-tenancy data processing system is adapted for data access. The system includes a host computing platform that includes one or more computers, each with memory and at least one processor. The system also includes different application networks deployed into a multi-tenancy computing environment established in the host computing platform. Each of the networks provides program logic of one or more application instances and also supports exchanges of messages between ones of the different end users within a same one of the networks. The system yet further includes a data access module.

The module includes computer program instructions enabled while executing in the host computing platform to define for each of the different application networks, a separate data space within the multi-tenancy computing system, each separate data space including an interface to one or more data repositories. As such, the program instructions process data queries by ones of the different end users irrespective of a corresponding one of the application networks, by extracting meta-data from each of the queries and filtering corresponding underlying data queries to the data repositories with a key derived from the extracted meta-data.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for data access within a multi-tenancy environment. In accordance with an embodiment of the invention, multiple different application networks are deployed into a multi-tenancy computing system in which each of the networks provides for common program logic in the form of one or more application instances accessed by corresponding end users, the end users exchanging messages with one another within a same one of the application networks. But, rather than each of the different end users accessing a common data space in which data for each application network is stored, a separate data space within the multi-tenancy computing system is provided for each one of the application networks. Each separate data space, in turn, includes an interface to one or more data repositories. Consequently, data queries by the different end users of a correspondingly different one of the application networks may be processed by first extracting meta-data from each of the queries and then filtering corresponding underlying data queries to the data repositories with a key derived from the extracted meta-data.

Figure 1:
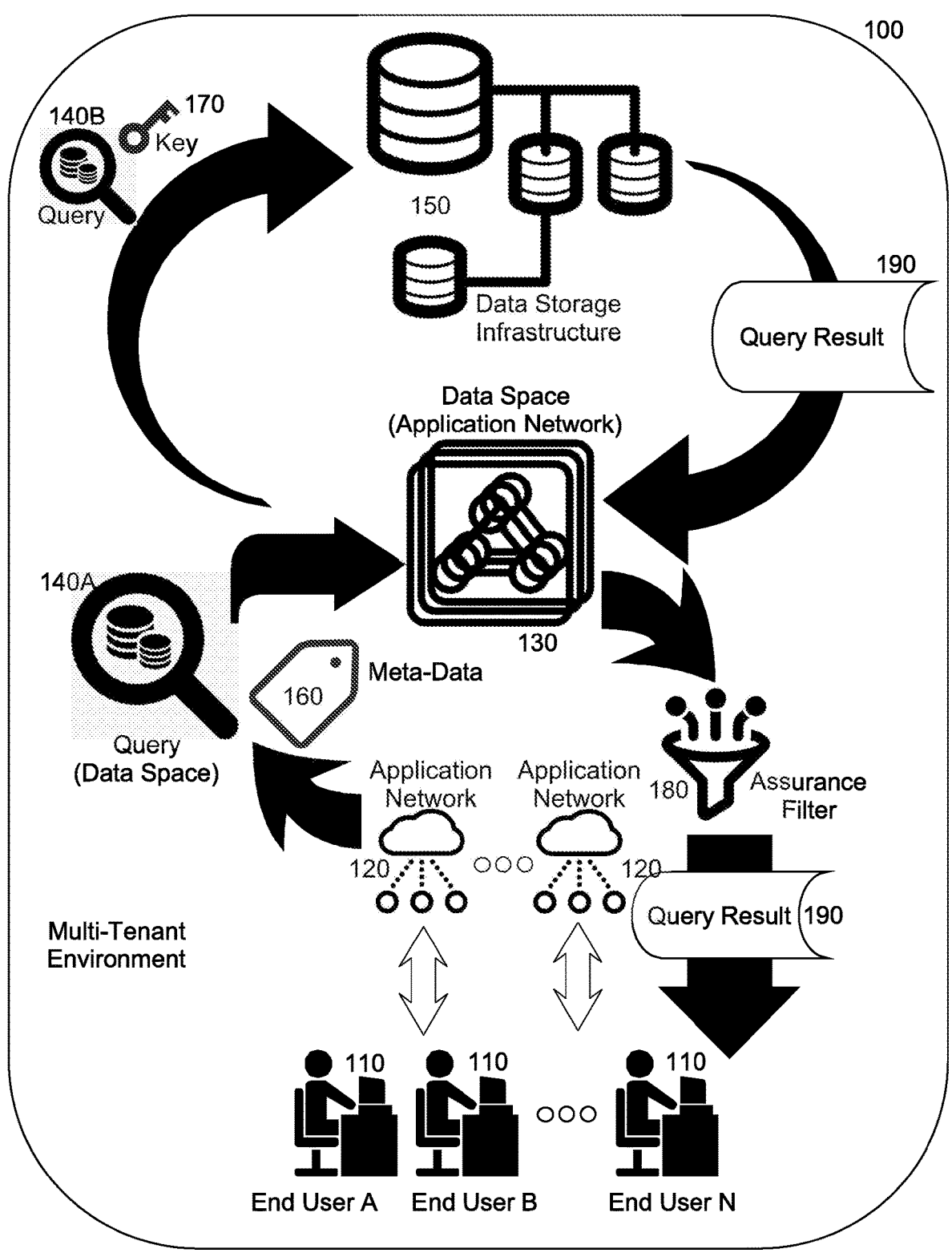
FIG. 1 is a pictorial illustration of a process for data access within a multi-tenancy environment.

In further illustration, FIG. 1 is a pictorial illustration of a process for data access within a multi-tenancy environment. As shown in FIG. 1, a multi-tenancy computing environment 100 includes a multiplicity of different application networks 120 each hosting one or more application instances accessed by correspondingly different end users 110. The multi-tenancy computing environment 100 further facilitates messaging between the end users 110 within a common one of the application networks 120 by way of a common event bus (not shown). The application instances of each of the application networks 120 read data from and write data to data storage infrastructure 150 that includes one or more data storage systems, such as a relational database, object store or key store on behalf of the different end users 110, however, a requests to process data in the application instance 120 are handled in respect to each individual one of the end users 110 in a corresponding data space 130.

In this regard, for each of the different application networks 120, a separate data space 130 is defined. Each data space 130 provides a virtual data access layer between a corresponding one of the application networks 120 and data in the data storage infrastructure 150, irrespective of the actual physical data storage resource or resources present in the data storage infrastructure 150 storing data accessible by the end users 110 of corresponding ones of the application networks 120. To that end, all data stored in the data storage infrastructure 150 is stored in connection with a key 170 corresponding to a different one of the end users 110. Consequently, when processing a logical query 140A in a particular one of the data spaces 130 on behalf of a corresponding one of the end users 110, the key 170 for the corresponding one of the end users 110 is extracted from meta-data 160 included with the logical query 140A.

Thereafter, the extracted key 170 may be incorporated into a query transformation 140B formatted in accordance with an actual data store within the data storage infrastructure 150. The query transformation 140 is then applied to the data storage infrastructure 150 in order to retrieve in response, a query result 190 including one or more data records. As a further assurance against data leakage between application networks 120, an assurance filter 180 is applied to the query result 190 to ensure that the data records within the query result 190 are associated with the corresponding one of the end users 110 from which the logical query 140A had been received. Finally, the query results 190 is returned to the corresponding one of the end users 110.

Figure 2:
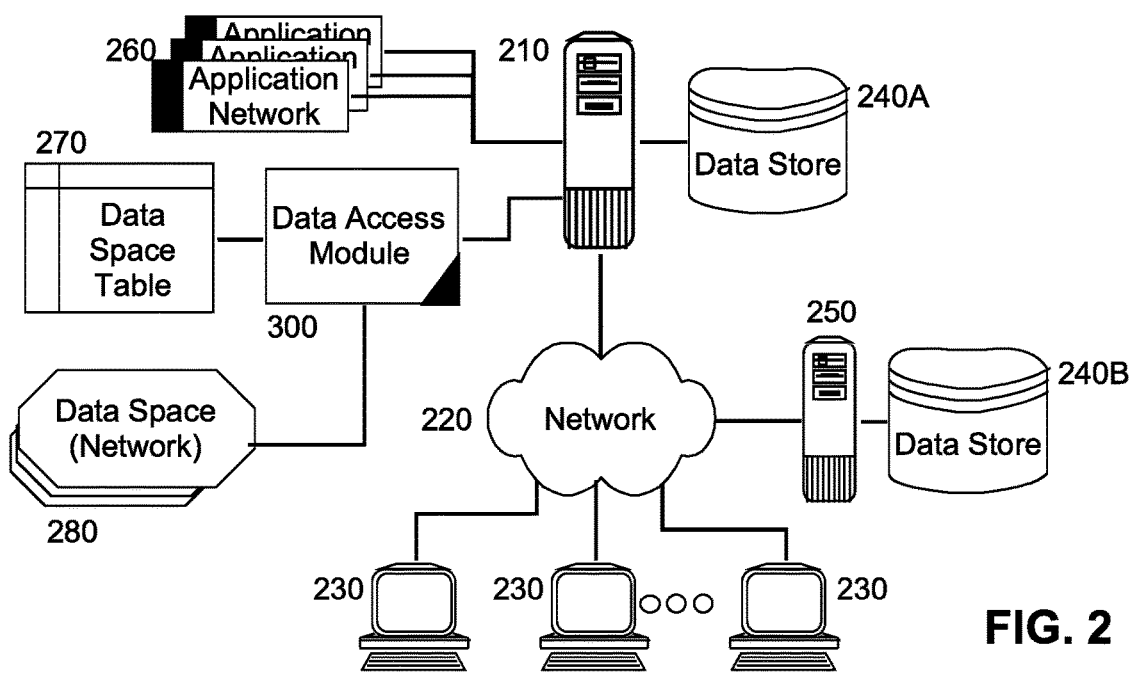
FIG. 2 is a schematic illustration of a multi-tenancy data processing system adapted for data access; and, FIG. 3 is a flow chart illustrating a process for data access within a multi-tenancy data processing system.

The process defined in respect to FIG. 1 may be implemented within a multi-tenancy data processing system. In yet further illustration, FIG. 2 schematically shows a multi-tenancy data processing system adapted for data access. The system includes a host computing platform 210 that includes one or more computers, each with memory and at least one processor. The host computing platform 210 is communicatively coupled to a local data store 240A that includes data storage formed from one or more of a relational database, object database, sequential database and flat file table. The host computing platform 210 optionally is additionally communicatively coupled to a remote data store 240B by way of remote data server 250, the remote data store 240B also including data storage formed from one or more of a relational database, object database, sequential database and flat file table.

Multiple different application networks 260 are defined within the host computing platform 210, each hosting one or more application instances and each providing concurrent access to a multiplicity of different client computing devices 230 from over computer communications network 220. The application instances of each corresponding one of the application networks 260 include computer program logic operable to read data from and write data to the local data store 240A and the remote data store 240B on behalf of different end users each accessing the application instance 260 from a respective one of the client computing devices 230. But, the data is not read directly from or written directly to the local data store 240A and the remote data store 240B. Instead, data access requests by the different end users are received in a data access module 300 managing different data spaces 280 for respective ones of the application networks 260.

More specifically, the data access module 300 includes computer program instructions executing in the memory of the host computing platform adjunct to each of the application instances of each corresponding one of the application networks 260. The program instructions are operable to receive a logical data query from a querying one of the end users by way of a respective one of the client computing devices 230 and to extract from the logical data query, meta-data identifying the querying one of the end users. The program instructions then conduct a lookup against a data space table 270 in order to retrieve a key corresponding to the querying one of the end users. The program instructions thereafter identify a portion of the data stores 240A, 240B associated with the logical query and formulate a query according to a proper format for the identified portion, including the retrieved key so as to implicate a corresponding one of the data spaces 280 for the querying one of the end users.

A result set is then received in response to the query and the result set. Optionally, the result set is subjected to a filter confirming not only the querying one of the end users, but also a target one of the end users specified within the meta-data of the logical query. To the extent that any data record returned within the result set cannot be associated with both the querying and target ones of the end users, the result set is purged. But, otherwise, the program instructions return the result set to one of the client computing devices 230 associated with the querying one of the end users over the computer communications network 220

Figure 3:
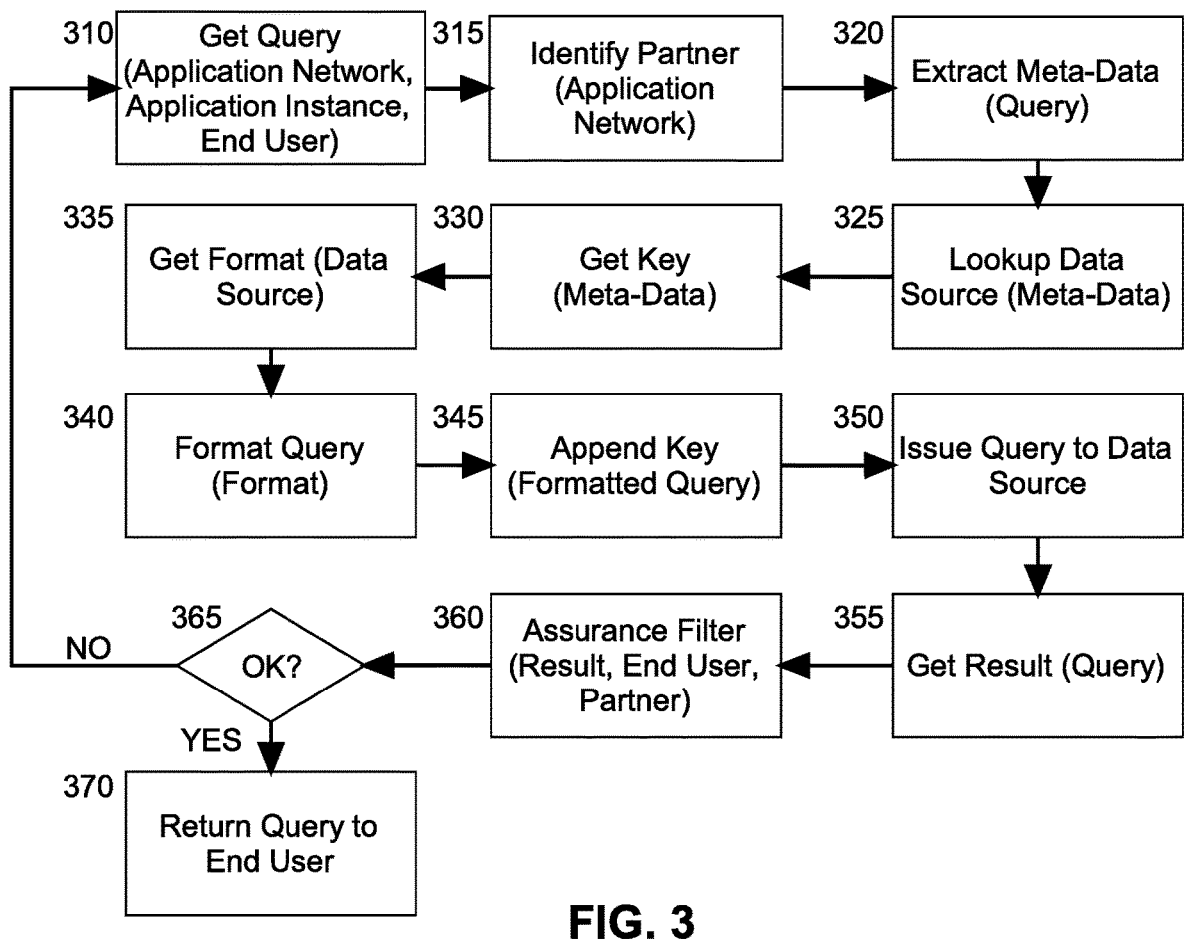

In more particular illustration of the operation of the data access module 300, FIG. 3 is a flow chart illustrating a process for data access within a multi-tenancy data processing system. Beginning in block 310, a logical query is received from a source end user of an application instance of a corresponding application network, and in block 315, a target end user is identified for the logical query. The logical query may specify criteria upon which one or more data records are to be returned in response to the logical query without respect to a specific underlying data storage system or systems in which the data records are stored. In block 320, meta-data may be extracted from the logical query, indicating at least in part, an identity of the source end user. In block 325, a lookup is performed in a table in respect to the logical query so as to identify an underlying data storage system or systems in which the data records are likely stored, and in block 330, a key is retrieved in respect to the meta-data.

Then, in block 335, a required query format is determined from the identified underlying data storage system or systems and in block 340, an actual query is formatted expressing the logical query. In block 345, the retrieved key is appended to the actual query so as to retrieve data records only having an association with the retrieved key. Then, in block 350 the actual query is issued to the identified underlying data storage system or systems. In block 355, a result is received in response from the identified underlying data storage system or systems and in block 360, an assurance filter is applied to the result set confirming an association with each data record in the result set with an identity of the querying end user and the target end user. In decision block 365, if the assurance filter determines that each data record in the result set corresponds to the identity of both the querying end user and target end user, in block 370, the result set is returned to the querying end user.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "include", "includes", and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A data access method for a multi-tenancy environment, the method comprising:
   deploying into a multi-tenancy computing system, different application networks in which different end users of different ones of the networks access therein common program logic of one or more application instances and also exchange messages between ones of the different end users within a same one of the networks;
   defining for each of the networks, a separate data space within the multi-tenancy computing system, each said separate data space comprising an interface to one or more data repositories and providing a virtual data access layer between a corresponding one of the different application networks and data in the data storage infrastructure, irrespective of actual physical data storage resource or resources present in the data storage infrastructure storing data accessible by the different end users of corresponding ones of the application networks; and,
   processing data queries by ones of the different end users by extracting meta-data from each of the queries and filtering corresponding underlying data queries to the data repositories with a key derived from the extracted meta-data.

2. The method of claim 1, wherein the meta-data is an identifier of a requesting one of the end users.

3. The method of claim 1, wherein the meta-data is an identifier of a requesting one of the end users and a target one of the end users.

4. The method of claim 1, wherein the meta-data is a combination of an identifier of the requesting one of the end users and an identifier for an associated one of the application instances.

5. The method of claim 3, further comprising:
   receiving a result set of data in response to one of the corresponding underlying data queries to the data repositories;
   confirming the data in the set corresponds to the identifier of the requesting one of the end users and the target one of the end users; and,
   filtering portions of the data from the set that do not correspond to the identifier of the requesting one of the end users and the target one of the end users.

6. The method of claim 1, further comprising identifying an underlying data source type for one of the corresponding underlying data queries to the data repositories and formatting the one of the corresponding underlying data queries in a format defined for the data source type.

7. A multi-tenancy data processing system adapted for data access, the system comprising:
   a host computing platform comprising one or more computers, each comprising memory and at least one processor;
   different application networks deployed into a multi-tenancy computing environment established in the host computing platform, each of the networks providing program logic of one or more application instances and also supporting exchanges of messages between ones of the different end users within a same one of the networks; and,
   a data access module comprising computer program instructions enabled while executing in the host computing platform to perform:
   defining for each of the networks, a separate data space within the multi-tenancy computing system, each said separate data space comprising an interface to one or more data repositories and providing a virtual data access layer between a corresponding one of the different application networks and data in the data storage infrastructure, irrespective of actual physical data storage resource or resources present in the data storage infrastructure storing data accessible by the different end users of corresponding ones of the application networks; and, processing data queries by ones of the different end users by extracting meta-data from each of the queries and filtering corresponding underlying data queries to the data repositories with a key derived from the extracted meta-data.

8. The system of claim 7, wherein the meta-data is an identifier of a requesting one of the end users.

9. The system of claim 7, wherein the meta-data is an identifier of a requesting one of the end users and a target one of the end users.

10. The system of claim 7, wherein the meta-data is a combination of an identifier of the requesting one of the end users and an identifier for an associated one of the application instances.

11. The system of claim 9, wherein the program instructions further perform:

receiving a result set of data in response to one of the corresponding underlying data queries to the data repositories;

confirming the data in the set corresponds to the identifier of the requesting one of the end users and the target one of the end users; and, filtering portions of the data from the set that do not correspond to the identifier of the requesting one of the end users and the target one of the end users.

12. The system of claim 7, wherein the program instructions further perform identifying an underlying data source type for one of the corresponding underlying data queries to the data repositories and formatting the one of the corresponding underlying data queries in a format defined for the data source type.

13. A computer program product for data access method for a multi-tenancy environment, the computer program product including a computer readable storage medium having program instructions embodied therewith, the program instructions executable by a device to cause the device to perform a method including:

deploying into a multi-tenancy computing system, different application networks in which different end users of different ones of the networks access therein common program logic of one or more application instances and also exchange messages between ones of the different end users within a same one of the networks;

defining for each of the networks, a separate data space within the multi-tenancy computing system, each said separate data space comprising an interface to one or more data repositories and providing a virtual data access layer between a corresponding one of the different application networks and data in the data storage infrastructure, irrespective of actual physical data storage resource or resources present in the data storage infrastructure storing data accessible by the different end users of corresponding ones of the application networks; and, processing data queries by ones of the different end users by extracting meta-data from each of the queries and filtering corresponding underlying data queries to the data repositories with a key derived from the extracted meta-data.

14. The computer program product of claim 13, wherein the meta-data is an identifier of a requesting one of the end users.

15. The computer program product of claim 13, wherein the meta-data is an identifier of a requesting one of the end users and a target one of the end users.

16. The computer program product of claim 13, wherein the meta-data is a combination of an identifier of the requesting one of the end users and an identifier for an associated one of the application instances.

17. The computer program product of claim 15, wherein the method further comprises:

receiving a result set of data in response to one of the corresponding underlying data queries to the data repositories;

confirming the data in the set corresponds to the identifier of the requesting one of the end users and the target one of the end users; and, filtering portions of the data from the set that do not correspond to the identifier of the requesting one of the end users and the target one of the end users.

18. The computer program product of claim 13, wherein the method further comprises identifying an underlying data source type for one of the corresponding underlying data queries to the data repositories and formatting the one of the corresponding underlying data queries in a format defined for the data source type.

* * * * *